US011974216B2

(12) United States Patent
Price et al.

(10) Patent No.: US 11,974,216 B2
(45) Date of Patent: *Apr. 30, 2024

(54) METHODS AND SYSTEMS FOR DISPLAY OF INFORMATION ASSOCIATED WITH AN ARTICLE BASED ON IMAGE ANALYSIS AND DETERMINED USER INTEREST

(71) Applicant: Capital One Services, LLC, McLean, VA (US)

(72) Inventors: Micah Price, The Colony, TX (US); Geoffrey Dagley, McKinney, TX (US); Qiaochu Tang, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/068,145

(22) Filed: Dec. 19, 2022

(65) Prior Publication Data

US 2023/0122703 A1  Apr. 20, 2023

Related U.S. Application Data

(63) Continuation of application No. 17/121,281, filed on Dec. 14, 2020, now Pat. No. 11,553,407.

(51) Int. Cl.
*H04N 1/00* (2006.01)
*H04W 4/02* (2018.01)
(Continued)

(52) U.S. Cl.
CPC ........ *H04W 48/16* (2013.01); *H04N 1/00225* (2013.01); *H04W 4/02* (2013.01); *H04W 84/12* (2013.01)

(58) Field of Classification Search
CPC ....... H04W 48/16; H04W 4/02; H04W 84/12; H04N 1/00225; G06Q 30/0281; G06Q 30/0623
See application file for complete search history.

(56) References Cited

U.S. PATENT DOCUMENTS 8,437,776 B2 *  5/2013  Busch ................ G06Q 30/0233
                                                                455/456.1
8,954,420 B1    2/2015  Khan et al.
(Continued)

OTHER PUBLICATIONS

International Search Report issued in International Application No. PCT/US2021/072849 dated Apr. 4, 2022 (14 pages).

*Primary Examiner* — Juan M Guillermety
(74) *Attorney, Agent, or Firm* — Bookoff McAndrews, PLLC

(57) ABSTRACT

A signal interpretation system includes a communication device, a memory storing instructions, and one or more processors configured to execute the instructions to perform operations including: receiving scanned information including a shape of at least one article scanned with a scanning device to identify the at least one article and identifying a geographic location of the scanning device, when a scan of the at least one article was performed, based on a location signal received from the scanning device. The operations also include evaluating a signal indicative of interest in the identified at least one article and transmitting, via the communication device, a notification based on the evaluated signal, the notification being indicative of the identified at least one article and the identified geographic location, the notification being configured to cause an update in at least one graphical element presented by the scanning device or another device.

20 Claims, 5 Drawing Sheets

(51) Int. Cl.
*H04W 48/16* (2009.01)
*H04W 84/12* (2009.01)

(56) References Cited

U.S. PATENT DOCUMENTS

| | | |
|---|---|---|
| 9,031,858 B2 | 5/2015 | Angell et al. |
| 9,147,216 B2 | 9/2015 | Seergy et al. |
| 9,530,263 B1 | 12/2016 | Daniel |
| 9,697,539 B2 | 7/2017 | Emigh et al. |
| 9,911,151 B1 | 3/2018 | Gordon et al. |
| 2011/0289010 A1* | 11/2011 | Rankin, Jr. ............ G06Q 10/10 707/727 |
| 2012/0095805 A1 | 4/2012 | Ghosh et al. |
| 2013/0317911 A1 | 11/2013 | Medlen |
| 2015/0248664 A1* | 9/2015 | Makhdumi ............ G06Q 30/06 235/380 |
| 2016/0278006 A1 | 9/2016 | Lee et al. |
| 2018/0285460 A1* | 10/2018 | Li ...................... G06Q 30/0641 |
| 2019/0080169 A1* | 3/2019 | Nowak-Przygodzki .................... G06Q 30/0281 |
| 2019/0279292 A1 | 9/2019 | Tang et al. |
| 2019/0385230 A1 | 12/2019 | Tang et al. |
| 2021/0049409 A1* | 2/2021 | Klein ................. G06F 18/2413 |

\* cited by examiner

METHODS AND SYSTEMS FOR DISPLAY OF INFORMATION ASSOCIATED WITH AN ARTICLE BASED ON IMAGE ANALYSIS AND DETERMINED USER INTEREST

CROSS-REFERENCE TO RELATED APPLICATION(S)

This patent application is a continuation of, and claims the benefit of priority to, U.S. Nonprovisional Patent Application No. 17/121,281, filed on Dec. 14, 2020, the entirety of which is incorporated herein by reference.

TECHNICAL FIELD

Various embodiments of the present disclosure relate generally to evaluating a signal from a scanning device, and, more particularly, to generating a notification according to an analyzed image.

BACKGROUND

Traditionally, potential customers and merchants interact in-person, typically in a merchant-maintained space such as a brick-and-mortar store, a merchant lot, or the like. A potential customer may interact (e.g., converse) with one or more on-site employees or representatives of the merchant while considering various products and/or services. During such an interaction, the one or more on-site employees or representatives of the merchant may discern the potential customer's interest, or lack thereof, with regard to the various products and/or services. In order to replicate this interaction, electronic storefronts (e.g., websites) can include a chat window, contact form, or otherwise invite a potential customer to interact with the merchant. However, these types of interaction mechanisms are often ineffective at assisting users based on their particular interests, and are used by a small proportion of potential customers. Additionally, while an entirely electronic shopping experience may be useful for some products, many potential customers prefer evaluating some types of products in person. For example, at least some potential customers prefer to evaluate relatively more expensive potential purchases, such as vehicles, furniture, jewelry, houses, boats, etc., in person. This is typically performed by interacting with the product itself, or with one or more similar products.

While traditional methods remain useful in some circumstances, both potential customers and merchants are increasingly driven toward systems that facilitate communication without requiring the presence of both parties at the same physical location or requiring the user to type messages via a chat window, e-mail, or a contact form. Additionally, current systems are not equipped to sufficiently evaluate a potential customer's interest in a product, or facilitate effective communication, when a customer views an article or product in a location that is not attended by merchant employees or representatives, such as, for example, an unattended vehicle lot.

The present disclosure is directed to overcoming one or more of the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for providing a notification based at least in part on an analysis of a scan (e.g., an image or video) of an article. The methods and systems may provide for improved analysis of a signal indicative of a user's interest in an article, and may allow a graphical element of a user device to be updated based on such a signal.

In one aspect, a signal interpretation system may include a communication device, a memory storing instructions, and one or more processors configured to execute the instructions to perform operations including: receiving scanned information including a shape of at least one article scanned with a scanning device to identify the at least one article based on the received scanned information and identifying a geographic location of the scanning device, when a scan of the at least one article was performed, based on a location signal received from the scanning device. The operations may also include evaluating a signal indicative of interest in the identified at least one article based on the received scanned information and transmitting, via the communication device, a notification based on the evaluated signal, the notification being indicative of the identified at least one article and the identified geographic location, the notification being configured to cause an update in at least one graphical element presented by the scanning device or another device.

In another aspect, a computer-implemented signal interpretation method may include receiving scanned information including a shape of at least one article from a scanning device, receiving geographic location information from the scanning device, the geographic location information corresponding to a geographic location of the scanning device, and identifying the geographic location of the scanning device based on a location signal received from the scanning device at a time of scanning the at least one article. The method may also include identifying the at least one article based on the scanned information, receiving a signal indicative of interest in the at least one article, evaluating the signal to determine a degree of interest in the at least one article, and transmitting a notification based on the received signal, wherein the notification is based on the determined degree of interest in the at least one article.

In yet another aspect, a computer-implemented signal interpretation method may include receiving geographic location information and scanned information from an imaging device, the scanned information including a shape of at least one article, identifying the geographic location of the imaging device based on a location signal received from the imaging device the location signal corresponding to an unattended lot, and identifying the at least one article based on the shape of the at least one article included in the scanned information. The method may further include receiving a signal indicative of interest in the at least one article, the signal including at least one of: a number of times the identified at least one article was scanned, a number of times an article related to the identified article was scanned, or a number of articles scanned at the identified geographic location, evaluating the signal to determine a degree of interest in the at least one article, and transmitting a notification based on the evaluated signal, wherein the notification is indicative of an identity of the at least one article, the geographic location, and the determined degree of interest in the at least one article.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
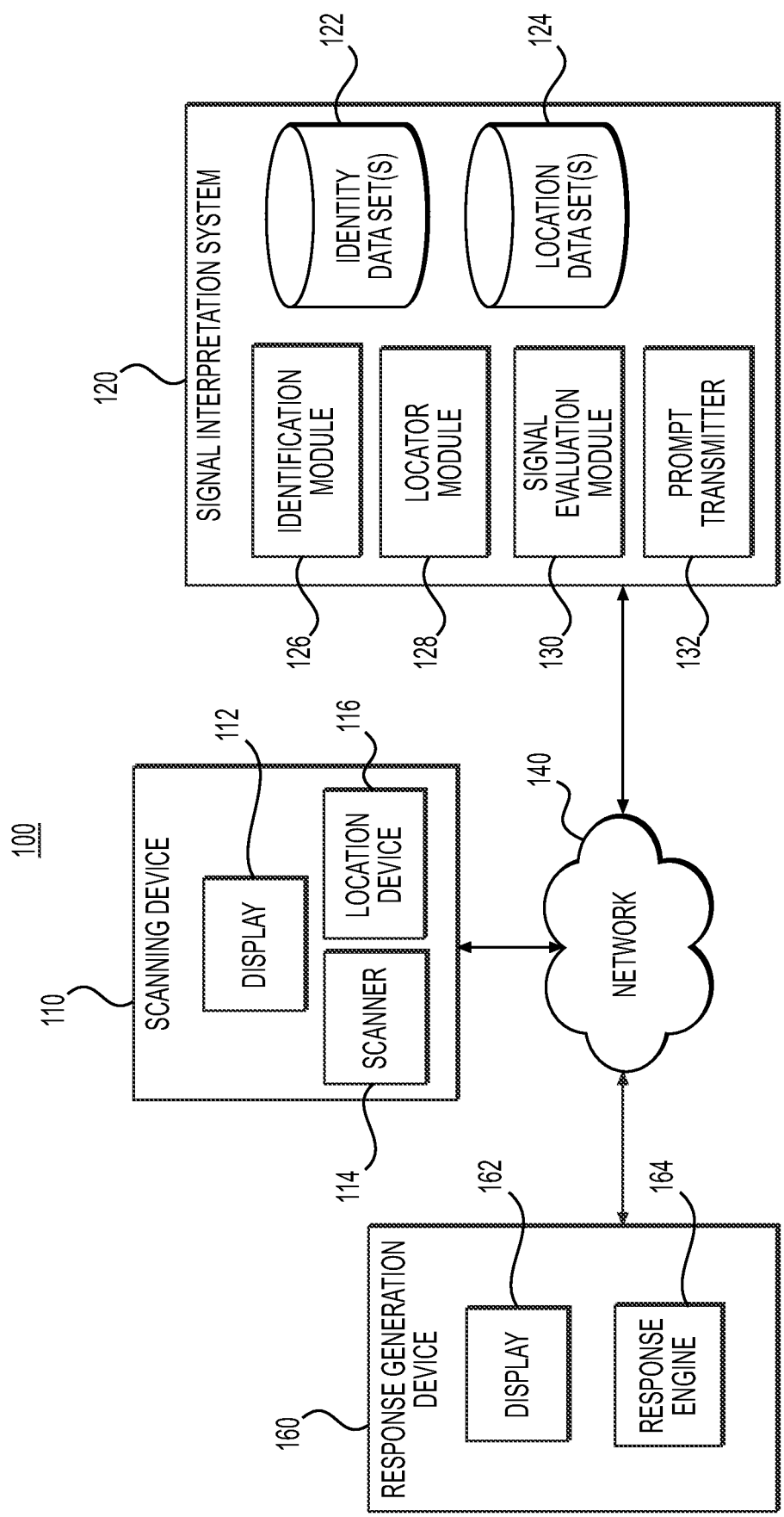
FIG. 1 depicts an exemplary system environment, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, in various embodiments, information, such as scanned information which may be analyzed via image analysis, geographic location information (e.g., one or more locations associated with, generated by, and/or received from a scanning device), and/or inventory information (e.g., from one or more inventory databases), may be employed in a system environment configured to evaluate potential interest in an article identified via image analysis. In some embodiments, a signal indicative of interest in an identified article may be evaluated. Examples of such signals may include an identity of one or more scanned articles, a number of scanned articles that are the same (e.g., a number of times an identified article was scanned), a number of scanned articles that are similar or related, a number of scanned articles in a particular geographic location or geographic area, searches performed (e.g., an article search history indicative of a number of times one or more articles were provided as an input to a search algorithm), number of locations visited, and/or user profile information, among others.

Advantageously, an interest signal may form the basis for transmitting a notification or prompt to a device. For example, a notification may be transmitted to the same device that performed one or more scans of an article or product, the notification being indicative of one or more articles associated with a location where the scan was performed. The notification may facilitate communication, for example, by providing a reminder and/or an offer that is relevant to the scanned article, at a time after the scan was performed (e.g., the next day, within the next seven days, etc.). The presentation of this information, e.g., by updating at least one graphical element of a landing page, a search filter, etc., may facilitate communication between a user and merchant following a user's observance of and/or direct or indirect interaction with one or more articles. Additionally, providing a notification or otherwise updating a graphical element based on an interest signal may facilitate a user's ability to effectively utilize an unattended or autonomous lot or storefront.

FIG. 1 is a diagram depicting an exemplary system environment 100 according to one or more aspects of the present disclosure. System environment 100 may include a scanning device 110 configured to generate one or more signals that are indicative of interest in an article and a communication device, such as signal interpretation system 120, which is configured to evaluate signals generated by scanning device 110 or other devices, as described in greater detail below. Scanning device 110 may further be configured to generate one or more images, videos, etc., that are analyzed by signal interpretation system 120. System environment 100 may also include a response generation device 160 configured to generate a response, e.g., a response to a notification from signal interpretation system 120. A network 140 may be configured to facilitate communication between one or more of scanning device 110, signal interpretation system 120, and response generation device 160.

Scanning device 110 may be a portable computing device having one or more processors for performing the functions described herein with respect to scanning device 110. Scanning device 110 may further include a display 112, a scanning component or scanner 114, and a location device 116. Each of the display 112, scanner 114, and location device 116 may be achieved with one or more hardware and software components of scanning device 110.

For example, display 112 may be controlled via one or more processors of scanning device 110 to present a prompt or notification to a user. Additionally, display 112 may be configured to receive inputs from a user, e.g., via a touch-screen presenting an on-screen keyboard, a website, native application or web-application, etc. In at least some embodiments, display 112 may be configured to present an identity of one or more articles scanned with scanner 114. Display 112 may be integrated into scanning device 110 or may be a remote display device. Display 112 may be configured to generate a scanning device display 200 (FIG. 2) as described below.

Scanning device or scanner 114 may include an optical recognition device, radiowave sensor, and/or other suitable hardware useful for identifying an article. For example, scanner 114 may include an imaging device such as a camera having one or more lenses and a sensor (e.g., charge-coupled device sensor or CMOS sensor). The sensor may be configured to capture a shape of at least a portion of an article, such as a vehicle or other product. If desired, scanner 114 may include a radio receiver and/or transmitter for identifying articles. Exemplary receiver/transmitters may include Bluetooth radios, near field communication radios, RFID devices, QR code readers (which may be formed by the above-described imaging device), or others.

Scanning device 110 may include one or more location devices 116, which may facilitate identification of a geographic location associated with scanning device 110 (e.g., a closest product lot) when an article is scanned with scanner 114. For example, in response to the use of scanner 114 to scan and identify an article, scanning device 110 may identify a current location of scanning device 110 via location device 116 and generate a location signal indicative of the identified geographic location. Location device 116 may include one or more hardware components, such as a global positioning system receiver, cellular radio, WiFi radio, Bluetooth device, or others. Location device 116 may be configured to identify a particular geographic location of scanning device 110 within, about 0.5 mi., about 0.25 mi., or even as accurate as about 20 feet or less, as a few examples. For example, a global positioning service (GPS) receiver of location device 116 may provide a relatively accurate location of scanning device 110. However, when location information from a global positioning receiver is unavailable (e.g., due to inability to receive GPS signals), the position of scanning device 110 may be determined based on a cellular radio (e.g., via multilateration of radiofrequency signals received from cellular service provider transmitters), WiFi radio (e.g., by recognizing one or more nearby service set identifiers (SSIDs)), by a nearby Bluetooth transmitter, or other device. In particular, a WiFi radio included in location device 116 may detect an SSID associated with a particular merchant or response generation device 160.

Signal interpretation system 120 may include one or more inventory or identity data sets 122, one or more location data sets 124, an identification module 126, a locator module 128, a signal evaluation module 130, and a prompt generator or prompt transmitter 132. Signal interpretation system 120 may include one or more servers or server systems having one or more processors and one or more storage devices or databases. In some embodiments, the databases may store information associated with one or more articles or products. While databases storing identity data sets 122 and location data sets 124 are illustrated as separate databases, a portion or an entirety of the databases storing identity data sets 122 and location data sets 124 may be combined and implemented in a single database. If desired, one or both of identity data sets 122 and location data sets 124 may be stored in a plurality of separate databases, redundant databases, etc.

Signal interpretation system 120 may include one or more processors configured (e.g., programmed) to perform methods described in this disclosure. Signal interpretation system 120 may include one or more modules, models, or engines, including a machine learning model for image analysis, as described below. The one or more modules, models, or engines may include one or more of identification module 126, locator module 128, signal evaluation module 130, and/or prompt transmitter 132, which may each be software components, hardware components, or a combination of software and hardware of signal interpretation system 120. Signal interpretation system 120 may be configured to utilize one or more modules, models, or engines when performing various methods described in this disclosure. In some examples, the signal interpretation system may be implemented on and/or may include a cloud computing platform with scalable resources for computation and/or data storage, and may run one or more applications on the cloud computing platform to perform various computer-implemented methods described in this disclosure. In some embodiments, some of the one or more modules, models, or engines may be combined to form fewer modules, models, or engines. In some embodiments, some of the one or more modules, models, or engines may be separated into separate, more numerous modules, models, or engines. In some embodiments, some of the one or more modules, models, or engines may be removed while others may be added.

Identity data sets 122 make store one or more data sets useful as inputs for a machine learning model that is configured to identify articles scanned with scanner 114 of scanning device 110. Identity data sets 122 may include any information useful for facilitating identification, via image analysis, of at least a portion of an article such as a vehicle. Identity data sets 122 may include a plurality of article images and one or more attributes or characteristics associated with respective ones of the images. In the example of vehicles, characteristics may include image elements such as shapes, outlines, colors, gradients, etc., indicative of at least one of: a make (e.g., a name associated with a particular manufacturer), a model, a trim level, optional equipment, features, production year, or model year.

Location data sets 124 may store information associated with one or more locations of articles, such as merchant or vendor lots. Location data sets 124 may associate one or more particular articles (e.g., a particular unique or single vehicle, or a particular make, model, and year) with a geographic location (e.g., one or more vehicle vendor lots). For example, location data sets 124 may include inventory information for one or more merchants and/or merchant locations. Location data sets 124 may include a list of vehicles, including detailed information for each vehicle (e.g., make, model, trim, model year, VIN, etc.) stored in one or more databases. This inventory information may correlate information for each vehicle with the location of the merchant and/or a lot associated with the vehicle.

Identification module 126 may be configured to receive scanned information from scanning device 110, and, based on the scanned information, identify a particular article. For example, identification module 126 may be configured to evaluate a received image or video of a vehicle (e.g., an image or video generated by scanner 114). Identification module 126 may employ one or more convolutional neural networks and training data sets to identify vehicles according to the scanned information. For example, identification module 126 may identify a particular article by comparing an image, or portion thereof, obtained from scanning device 110 with one or more images or image components stored in identity data sets 122. In some embodiments, identification module 126 may include a machine learning model (e.g., a convolutional neural network). As used herein, a "machine learning model" includes data, instructions, algorithms, and/or other information together forming a machine that, once trained using a set of training data and a set of ground truths associated with the set of training data, is configured to output a result when provided with a given input. For example, training data may include data corresponding to one or more features extracted from an image or video of at least a portion of an article, and a corresponding ground truth may include an identity of one or more articles, an identity of a make, an identity of a model, an identity of a trim, an identity of a feature, and/or one or more other identity characteristics associated with these features.

Locator module 128 may be configured to compare one or more articles identified by identification module 126 with article location information stored in location data sets 124 stored in one or more databases. Location data sets 124 may correspond to a partial or full inventory of one or more merchant or vendor lots, and may include information regarding a plurality of articles that are located at a particular geographic location. The geographic location may be, for example, a geographic location corresponding to a particular merchant (e.g., dealership).

Signal evaluation module 130 may be configured to evaluate, and if desired, assign a rank or score to, a particular user's interest in one or more articles based on interest signal(s). For example, signal evaluation module 130 may evaluate one or more signals generated by a device associated with a user, such as scanning device 110 and/or one or more additional devices associated with the same user. Exemplary signals may include one or more of: a number of times the identified at least one article was scanned, a number of times an article related to the identified article was scanned, an amount of time spent reviewing a scanned article (e.g., after the article is identified via a scan, following a search for the article, etc.), a number of articles scanned at the identified geographic location, such as a single vehicle lot, or a number of related geographic locations that were visited, such as a number of vehicle lots on which at least one article was scanned. Additionally or alternatively, exemplary signals may include a user indicating that one or more articles are favorited or saved articles, are highly-rated articles (e.g., by rating an article by a score of 75% or higher), by bookmarking articles, saving articles for viewing at a subsequent time, adding articles to a list of articles, and/or others. These articles may be articles that were identified after scanning, before scanning, or while scanning. For example, articles may be identified by processes such as searching for articles, selecting articles, renting articles, testing articles, etc., and subsequently correlated with one or more articles that are identified via scanning. Exemplary signal interpretation is described in detail below.

Prompt transmitter 132 may be configured to allow signal interpretation system 120 to send one or more prompts or notifications to one or more scanning devices 110 and to one or more response generation devices 160. These notifications may be transmitted from signal interpretation system 120 to scanning device 110 and response generation device 160 via network 140, or may be directly communicated to one or both of scanning device 110 and response generation device 160. Exemplary notifications generated and transmitted by prompt transmitter 132 to scanning device(s) 110 may include a notification for updating at least one graphical element and/or displaying one or more particular articles, based on the signals interpreted by signal evaluation module 130. Exemplary notifications generated and transmitted by prompt transmitter 132 to response generation device(s) 160 may include one or more response requests. Response requests may identify one or more particular articles based on interest signals and, if desired, may identify one or more users associated with scanning device 110 so as to allow response generation device 160 to prepare and generate a response for the end-user associated with scanning device 110.

Response generation device 160 may be configured to receive a notification in the form of a response request generated by signal interpretation system 120. Display 162 may present information indicative of this response request to one or more merchant users. Response generation device 160 may generate one or more responses (e.g., response notifications) to one or more user devices, including one or more scanning devices 110 or other devices associated with end-users, based on an amount of interest identified by system 120.

For example, response generation device 160 may receive a response request notification or other communication from signal interpretation system 120 indicative of a particular user's interest in one or more articles. This notification may be displayed by a display 162 of response generation device 160, for example. Upon receiving this notification and/or in response to an input from an operator of device 160, a response engine 164 may generate a response notification (e.g., an offer, a reminder, etc.) that is transmitted to one or more user devices (e.g., scanning device 110) via network 140. The response notification generated by response engine 164 may correspond to an active notification (e.g., a "push" notification), a landing page of an application, an update in a search filter, a web page, an e-mail, a text-based message, and/or any other communication that allows response generation device 160, via response engine 164, to provide an appropriate response, offer, reminder, etc., to an end-user that was determined by signal evaluation module 130 to have an interest in one or more articles. This response notification may be transmitted to signal interpretation system 120 or to scanning device 110, as described below.

Network 140 may be any suitable network or combination of networks and may support any appropriate protocol suitable for communication of data to and from scanning device 110 or other devices associated with one or more users, signal interpretation system 120, response generation device 160, and between various other components in system environment 100. Network 140 may include a public network, a private network (e.g., a network within an organization), or a combination of public and/or private networks. Network 140 may be configured to provide communication between various components depicted in FIG. 1 and any other systems described herein. For example, the network 140 may be implemented as the Internet, a wireless network, a wired network (e.g., Ethernet), a local area network (LAN), a Wide Area Network (WANs), Bluetooth, Near Field Communication (NFC), combinations thereof, or any other type of network or combination of networks that provides communications between one or more components of system environment 100. In some embodiments, network 140 may be implemented using cell and/or pager networks, satellite, licensed radio, or a combination of licensed and unlicensed radio.

Figure 2:
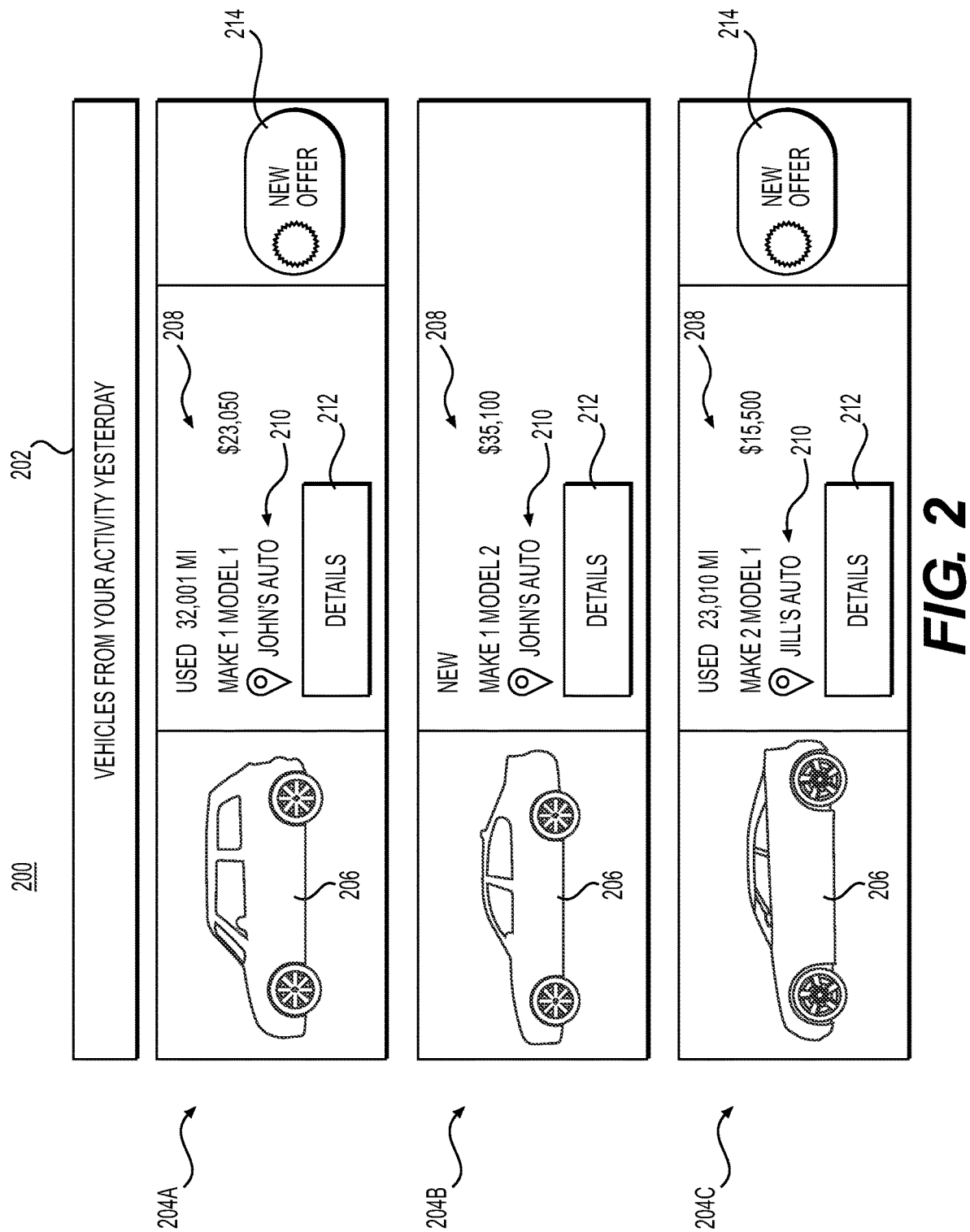
FIG. 2 depicts an exemplary display including updateable graphical elements, according to one or more embodiments.

FIG. 2 is an illustration of an exemplary display 200 that may be presented by a device associated with a particular user. Display 200 may be displayed on display 112 of scanning device 110, and/or another computing device that is associated with an end-user. While the exemplary display 200 in FIG. 2 illustrates a plurality of articles in the form of vehicles, as understood, the articles may instead be other objects, products, and/or services.

Display 200 may be presented to a user based on one or more interest signals generated based on one or more actions of a user, and, in particular, a user's actions associated with and/or performed by scanning device 110. Display 200 may be presented via display 112, or another device associated with a user of scanning device 110. Display 200 may include a plurality of sections that are generated or updated based on signal(s) from device 110, such as a callout element 202 and one or more signaled articles. Callout element 202 may be updated based at least in part on geographic information generated by location device 116 when one or more articles are scanned with scanner 114. Signaled articles, such as signaled articles 204A, 204B, and 204C, may correspond to articles scanned with scanner 114 and identified by identification module 126. One or more images corresponding to articles identified by identification module 126 may be presented as one or more identified article images 206. Information associated with each signaled article 204A, 204B, 204C, etc., may be presented as article information 208. In the exemplary display 200 shown in FIG. 2, article information 208 in the form of text, may identify at least one of a condition (e.g., new or used), model year, time of manufacture, age, mileage, make, model, trim, or a cost. A geographic location associated with each respective signaled article 204A, 204B, 204C, may be displayed as an associated location element 210 in the form of text, a map, or any other suitable form. An action element 212 may be associated with a particular signaled article 204A, 204B, 204C, in order to provide an interactive element that, when selected, displays additional information regarding a signaled article 204A, 204B, 204C, the geographic location associated with the respective signaled article, etc.

In some aspects, one or more graphical elements, such as callout element 202, signaled article images 206, article information 208, associated location element 210, or action element 212 may be generated based on a transmission generated by prompt transmitter 132 of signal interpretation system 120 (FIG. 1). In some aspects, all of these graphical elements may be presented based on one or more transmissions from signal interpretation system 120.

In addition to graphical elements generated according to transmissions from signal interpretation system 120, one or more graphical elements may be displayed based on transmissions generated by a response generation device 160. For example, response engine 164 of response generation device 160 may transmit a response configured to cause a response element 214 to be displayed and/or updated. In some aspects, response element 214 may represent a response generated by a merchant-user associated with one or more signaled articles. One or more merchants may, for example, interact with response generation device 160 and, with use of display 162 and/or one or more input devices, generate a response in the form of an offer for one or more identified articles or similar articles, an invitation to view one or more identified articles, an invitation to view articles similar to one or more identified articles, etc.

Figure 3:
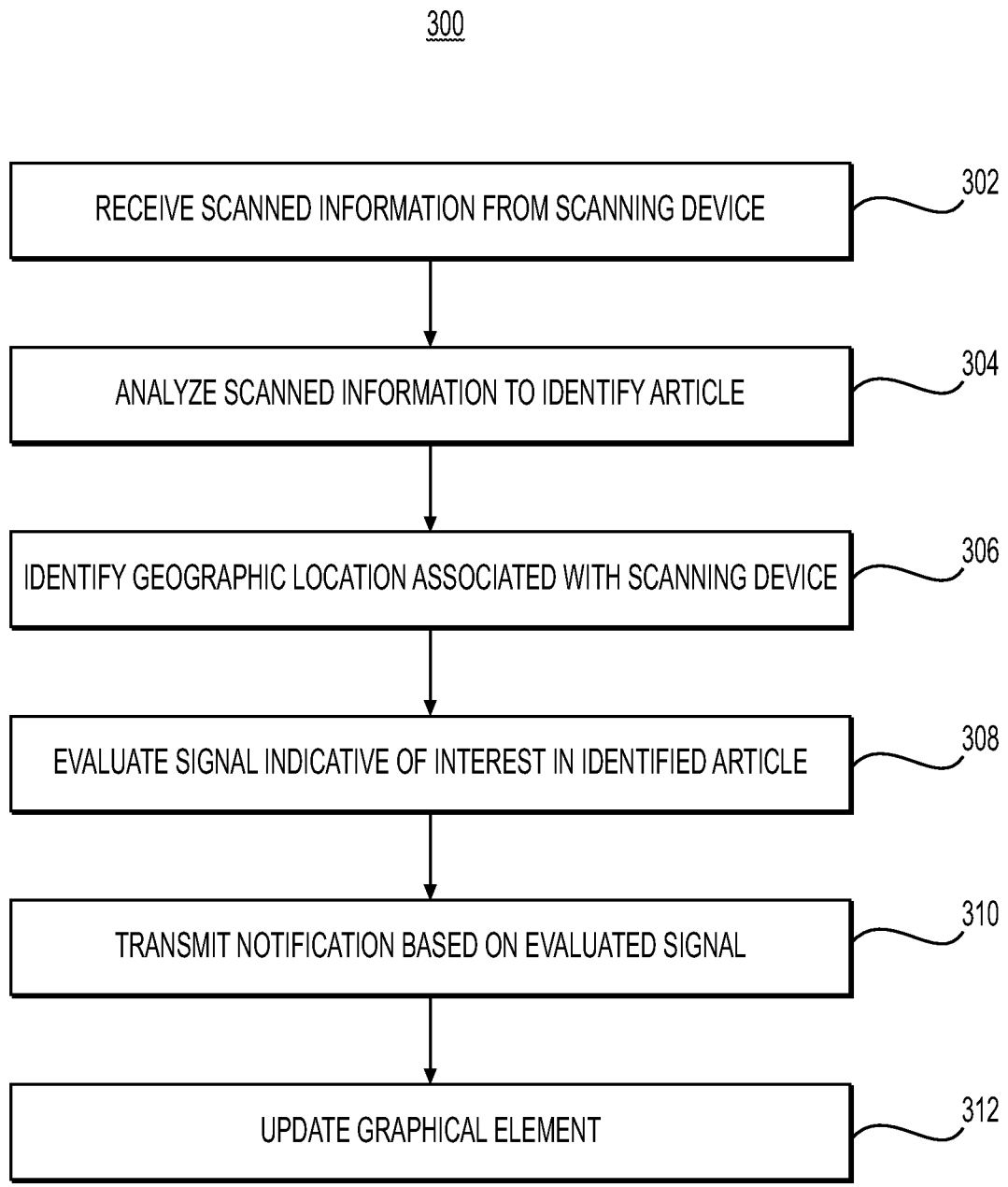
FIG. 3 depicts a flowchart of an exemplary computer-implemented signal interpretation method, according to one or more embodiments.

FIG. 3 illustrates a flowchart for a signal interpretation method 300 which may be implemented by processing information gathered or generated with an optical recognition device, such as a scanner 114. In an initial step 302, signal interpretation system 120 may receive scanned information from scanner 114. That is, scanner 114 may, via an image sensor and/or one or more additional sensors (e.g., radio transmitters/receivers), generate scanned information. This scanned information may include an image and/or a video of one or more articles, including a shape of an entirety or a portion of the one or more articles. Scanning device 110 may transmit the scanned information, which is received by signal interpretation system 120.

For example, a user present on, for example, an unattended lot or storefront, may scan an article via scanner 114. In particular, step 302 may include receiving information scanned from a user device, such as scanning device 110, while the device is physically located at an unattended vehicle lot, facilitating communication between end-users and merchants without requiring an immediate action by a merchant.

In a step 304, the received scanned information may be analyzed by identification module 126 to identify one or more articles present in the scanned information. This may be performed via one or more suitable image analysis algorithms, which may enable model generation from images of identity data sets 122, training data sets, statistical algorithms, etc. The generated models may include a convolutional neural network, a deep neural network, or a recurrent neural network configured to determine one or more attributes based on features extracted from the received scanned information. Suitable machine learning algorithms may be trained by supervised, unsupervised or semi-supervised learning processes, e.g., using training sets comprising data of types similar to the type of data used as the model input. For example, the training set used to train the model may include any combination of the following: article shapes, logo shapes, article colors, article gradients, etc.

In some aspects, attributes determined in step 304 may correspond to characteristics or features of an article represented in the scanned information. For example, based on a shape contained in the received scanned information, characteristics may be determined, such as: a brand identifier, model identifier, features identifier (e.g., letters and/or numbers corresponding to a particular set of features or options), a shape of a part (e.g., front lighting, rear lighting, mirror shape, window shape, door handle shape, etc.), and/or an overall shape of a portion or entirety of the article (e.g., a front profile, a side profile, an overhead profile, an angled profile, etc.). When the article in the scanned information is a vehicle, the attributes may correspond to vehicle attributes, and the vehicle may be identified based on one or more of these determined attributes. In particular, one or more vehicle attributes used to identify a vehicle present in the scanned information may facilitate the identification of a vehicle model, a vehicle make, a model year, a trim level, and/or vehicle options.

A step 306 may include identifying a geographic location associated with scanning device 110. The geographic location associated with scanning device 110 may be identified by signal interpretation system 120. In some aspects, this geographic location may be identified based on location information generated by one or more of a global positioning system receiver, cellular radio, WiFi radio, or Bluetooth device of scanning device 110. In some aspects, location information may be transmitted, via network 140, to signal interpretation system 120 with the scanned information. Each set of scanned information and geographic information may be associated with each other such that the location information is indicative of a location of the scanning device 110 and scanner 114 at the time when one or more scans were performed. In some aspects, a location information may be determined each time a scan is performed, and the determined location information may be transmitted, with the scanned information, to signal interpretation system 120.

In some aspects, step 306 may include identifying, with signal interpretation system 120, a geographic location of a merchant, or other entity, associated with the articles identified during step 304. For example, the received geographic location information generated and received from scanning device 110 may be compared to one or more known locations of merchants stored as merchant location information in location data sets 124.

For at least some scans performed with scanning device 110, an individual identified article may correspond to a plurality of articles at a respective plurality of locations (e.g., lots) identified within the location data sets 124. For example, a vehicle may be identified based on a particular make, model, and trim level, which may be the same as vehicles at a plurality of lots within a predetermined distance of the user. If desired, during step 306, signal interpretation system 120 may query location data sets 124 to determine whether one or more merchant locations (including the merchant location where the scan was performed) are in possession of the particular article identified in step 304. The merchant location where the scan was actually performed may be assigned a higher rank as compared to other merchant locations.

Additionally, as location data sets 124 may include inventory information (e.g., including information for a plurality of vehicles, a location of each vehicle, and/or a merchant for each vehicle), signal interpretation system 120 may determine additional information for the vehicle that was not identified by the scanned information. This may facilitate the identification of one or more characteristics of a vehicle that could not be identified by image analysis. For example, as shown in FIG. 2, an image analysis and query of identity data sets 122 and location data sets 124 may result in the identification of a white vehicle of a particular make (e.g., Make 1) and a particular model (e.g., Model 1) at a particular geographic location (e.g., John's Auto). In an example where location data sets 124 indicate that only one vehicle contains one or more of these characteristics, additional characteristics, such as a trim, mileage, cost, condition, or others, may also be determined. Additionally, graphical elements may be updated, as described below, based on these additional determined characteristics.

Steps 302, 304, and 306 may be performed a plurality of times such that scanned information is received for a plurality of articles, the plurality of articles (which may include a plurality of identical articles, similar articles, or different categories of articles). In some aspects, a plurality of geographic locations may also be identified, as well as a number of scans performed at each identified location.

A step 308 for evaluating a signal indicative of interest in one or more identified articles may be performed based on the information received and analyzed in steps 302 and 304, as well as the geographic location(s) identified in step 306. As described above, one or more signals may be generated by scanning device 110 and received by signal interpretation system 120. Additionally or alternatively, one or more signals may be received by one or more other systems, including one or more systems associated with a user of scanning device 110. Signals analyzed in step 308, whether received from scanning device 110, from another system, from multiple sources, or from a combination of these, may be indicative of an amount of interest or a degree of interest a user has for a particular article (e.g., a particular article type, a particular article model, or a particular individual article).

Interest signals generated by scanning device 110 may correspond to, for example, the transmission of scanned information, a number of times a particular identified article was scanned, a number of times an article related to the identified article was scanned, or a number of articles scanned at a particular identified geographic location. Signal interpretation system 120 may determine that interest exists for a particular article based on any of these signals, and in particular, based on the act of scanning the article and the transmission of scanned information. This interest may be correlated to a make and a model, or other identification associated with a particular type of article identified as a result of the scan. In some aspects, an amount of interest may be determined and stored in a memory associated with system 120 (e.g., stored as a binary flag) for each identified article each time scanned information is transmitted by scanning device 110 and received by signal interpretation system 120.

In some aspects, signal interpretation system 120 may determine that interest exists based on a number of times a particular identified article was scanned. As an example, signal interpretation system 120 may determine a number of times a particular make and model of a vehicle was scanned by a user. These scans may occur at different times and/or at different geographic locations. Signal interpretation system 120 may determine how many times a particular identified article was scanned over a predetermined period of time (e.g., one day, one week, one month, etc.), or without considering a particular period of time. When a rank is generated for a plurality of identified articles, an increasing rank may be associated with a higher number of times a particular article (e.g., particular make and model) was scanned.

In some aspects, signal interpretation system 120 may determine that interest exists for one or more particular articles based on a number of times related identified articles were scanned and/or an amount of time a user spent viewing an article, reading information about an article, etc. For example, signal interpretation system 120 may receive a scanned information a plurality of times from a single scanning device 110. Once scanned articles are identified, signal interpretation system 120 may be configured to extract one or more article properties corresponding to each article. In the example of vehicles, the one or more article properties may include a vehicle type (e.g., sedan, coupe, truck, compact car, mid-size car), a vehicle color, a vehicle manufacturer, a vehicle class (e.g., economy, luxury, sports car, convertible, SUV, etc.), or any combination thereof. When a rank is generated for a plurality of identified articles, an increasing rank may be associated with a higher number of times related articles were scanned.

In some aspects, signal interpretation system 120 may determine that interest exists in a particular vehicle and/or particular manufacturer based on a number of articles scanned at a particular identified geographic location, an amount of time spent viewing a scanned article, etc. For example, a larger number of vehicles scanned at a particular lot (or a plurality of related lots), or a greater period of time spent viewing one or more articles or information that was retrieved for such articles, may correspond to an increased amount or degree of interest. In some aspects, a particular geographic location of a vehicle lot may be associated with a particular article manufacturer or a particular type of vehicle (e.g., sports cars, trucks, recreational vehicles, boats, etc.). Signal interpretation system 120 may be configured to determine interest in a particular article manufacturer, a particular type of article, a particular article merchant, or any combination thereof, based on the identified geographic location received from scanning device 110 during step 306. When a rank is generated for a plurality of identified articles, an increasing rank may be associated with a number of articles scanned at a single identified geographic location. Additionally or alternatively, an increasing rank may be associated with a number of articles scanned at a plurality of geographic locations within a predetermined distance of each other.

As described above, signal interpretation system 120 may be configured to evaluate interest signals received from devices other than scanning device 110. For example, signal interpretation system 120 may be configured to determine an amount of interest based on a transmission from a device other than scanning device 110. For example, such transmissions received by signal interpretation system 120 may include a search request (e.g., a search for a particular article, type of article, article characteristic, etc.), an indication that a particular article is a highly-rated article (e.g., by giving an article rating equal or greater than a predetermined rating, such as 75% or higher), an indication that a particular article is a favorite article, among others. Each of these types of signals may be generated by scanning device 110, in addition to one or more other systems. When a rank is generated for a plurality of identified articles, an increasing rank may be associated with a higher number of search requests and/or higher ratings.

One or more scoring algorithms may be configured to determine different amounts of interest, and assign ranks, for a plurality of articles based on any of the above-described signals generated by and received from scanning device 110 or other systems. In some aspects, signal interpretation system 120 may determine relative weights of an interest signal based on one or more criteria including: the origin of the signal (e.g., from scanning device 110 or another system), the type of signal (e.g., a scan of an article as compared to a search for the article), and/or a strength of the signal (e.g., with multiple scans of a particular article and/or scans at a particular article location being indicative of increasing interest strength). By scoring interest and ranking identified articles according to one or more of these criteria, signal interpretation system 120 may, during step 308, determine one or more articles that have a greatest amount of interest according to signals generated by a particular user, and assign ranks appropriately.

Step 310 may include transmitting a notification based on the signal(s) evaluated in step 308. This notification may be transmitted to scanning device 110 and/or to a device other than scanning device 110 that is associated with the user of scanning device 110. Additionally or alternatively, the notification may be transmitted to a response generation device 160. The notification may be indicative of one or more articles that were identified on the basis of one or more scans performed with scanning device 110, whether the notification is transmitted to scanning device 110, to response generation device 160, or to one or more other systems. In some aspects, the notification may be transmitted only when signal interpretation system 120 determines that one or more predetermined conditions, such as the elapse of a predetermined period of time, a predetermined minimum amount of interest has been identified, etc., has occurred.

The notification may cause one or more graphical elements, e.g., elements displayed by display 112 and/or display 162, to update. The graphical element may be provided in various forms, such as text, images, and/or icons, presented as an active graphical element (e.g., a "push" notification or banner). Additionally or alternatively, the updated graphical element may be presented when a user next interacts with an application, a merchant website, and/or a service provider website. The updated graphical element may, for example, be presented in a landing page of an internet service or property that is different than an application employed to perform the above-described scans. The updated graphical element may correspond to an auto-generated search filter, such search filter effective to initiate a search for articles that are the same as, or similar to, one or more identified articles. The notification may also be presented via an SMS service, e-mail, or other messaging services. An exemplary group of updateable graphical elements contained in display 200 (FIG. 2) includes callout element 202, and one or more signaled articles 204A, 204B, 204C. As described above, signaled articles may include an identified article image 206, article information 208, an associated location element 210, and/or an action element 212.

In step 312, one or more graphical elements may be updated at any suitable time after a scan of an article is performed. For example, as described above, the notification may be transmitted only after the passage of a predetermined period of time such that the graphical element is updated after the passage of this predetermined period of time. The notification may be presented on display 112 of scanning device 110, or on a different device associated with the user of scanning device 110. When the notification includes content indicative of a rank of one or more identified articles, graphical elements may be updated accordingly. For example, the notification may be indicative of an article having a highest rank, second-highest rank, third-highest ranks, etc., among a plurality of ranked articles, and graphical elements for each identified article (e.g., signaled articles 204A, 204B, 204C) may be presented in descending order according to these assigned ranks. Each of the above-described steps of method 300 may be repeated as a user interacts with scanning device 110 and scans various articles.

Figure 4:
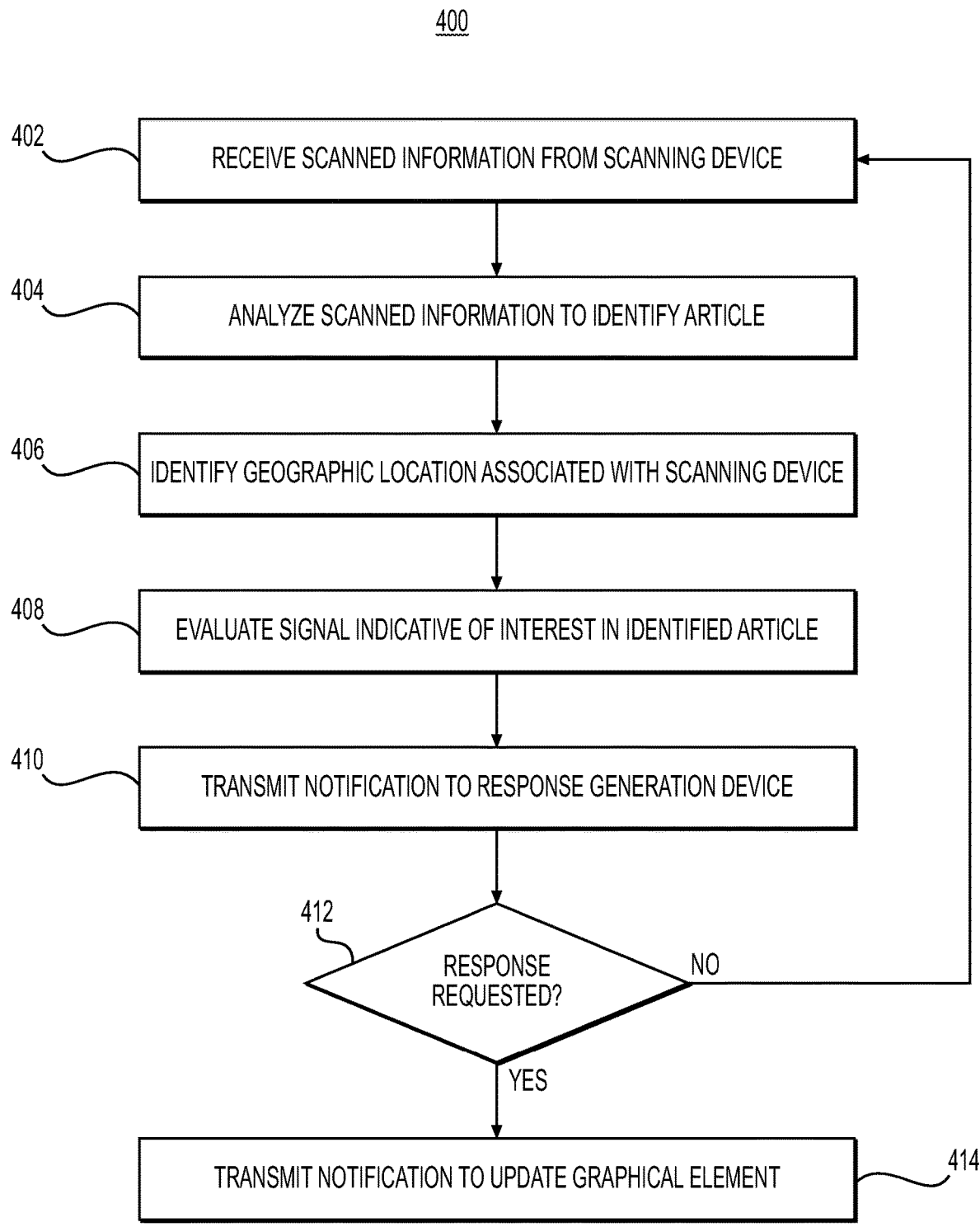
FIG. 4 depicts a flowchart of another exemplary computer-implemented signal interpretation method, according to one or more embodiments.

FIG. 4 illustrates a flowchart for a signal interpretation method 400 which may be implemented by processing information gathered or generated with an optical recognition device, such as a scanner 114, according to aspects of the present disclosure. Method 400 may include a step 402 of receiving scanned information, a step 404 of analyzing scanned information, a step 406 of identifying a geographic location, and a step 408 of evaluating one or more signals. Steps 402, 404, 406, and 408 may be performed in the same or a similar manner as steps 302, 304, 306, and 308, respectively, as described above.

Step 410 may include transmitting a notification from signal interpretation system 120 to response generation device 160. This transmission may include information indicative of an article identified in step 404, a geographic location identified in step 406, or both. For example, response generation device 160 may be associated with one or both of the identified article and the identified location, and the transmission of a notification may be targeted to one or more response generation devices 160 based on the identified location. In particular, the identified article may correspond to one or more articles in an inventory of a merchant associated with response generation device 160. Additionally or alternatively, the identified geographic location may be a location (e.g., a location of a vehicle lot, or a location within a predetermined distance of the merchant) of a merchant associated with response generation device 160.

Step 410 may include providing a notification that is presented via display 162 to prompt a merchant-user of response generation device 160 to generate a response for an end-user associated with scanning device 110. For example, the notification for response generation device 160 may include one or more of, a name associated with a user of scanning device 110, an identity of one or more scanned and identified articles and/or other articles of interest to the user, and other information the end-user may wish to share (e.g., budget information, article preferences, etc.) to enhance communication between the user and one or more merchants associated with response generation device 160.

In step 412, signal interpretation system 120 may determine whether a request to generate a response ("response request") was received from response generation device 160. The response request may correspond to a transmission from response generation device 160 to generate a particular response for scanning device 110 or another device associated with the user of device 110. When the determination in step 412 is negative and no response request is received, method 400 may return to step 402, or step 412 may be repeated after a predetermined period of time. When a response request is received in step 412, the determination may be positive, and step 414 may be performed.

In step 414, a response notification ("response") may be transmitted from signal interpretation system 120 or an associated system, to scanning device 110 or another device associated with the user. This response may be generated by response engine 164 or based at least in part on information from response engine 164. For example, a merchant-user may interact with response generation device 160 in order to generate a response in the form of an offer for an article identified via image analysis, or one or more related or similar articles. While this response may be transmitted directly to scanning device 110 via network 140, increased data security may be achieved by transmitting the response to signal interpretation system 120 such that prompt transmitter 132 may generate a response notification.

For example, in step 414, signal interpretation system 120 may transmit a response that updates one or more graphical elements in a manner similar to any of the aspects above, e.g., as described with respect to step 312. If desired, the transmitted response may be configured to cause an update in one or more graphical elements that are different than graphical elements that are updated by signal interpretation system 120 alone. For example, with reference to FIG. 2, one or more response elements 214 that would not be updated by system 120 unless authorized by device 160, may be updated based on the response. Additionally or alternatively, other elements of display 200 may be updated based on the response from device 160. For example, the signaled article (e.g., the particular article 204A, 204B, 204C) presented on display 200 may be determined based on an article included in the response from device 160. Additionally or alternatively, one or more of the article image 206, article information 208, and associated location element 210 may be determined based in part, or if desired, entirely, based on the response from device 160.

In general, any process discussed in this disclosure that is understood to be computer-implementable, such as the processes illustrated in FIGS. 3 and 4, may be performed by one or more processors of a computer system, such as signal interpretation system 120, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system or server system, such as scanning device 110, signal interpretation system 120, and/or response generation device 160, may include one or more computing devices. If the one or more processors of the scanning device 110, signal interpretation system 120, and/or response generation device 160 are implemented as a plurality of processors, the plurality of processors may be included in a single computing device or distributed among a plurality of computing devices. If scanning device 110, signal interpretation system 120, and/or response generation device 160 comprises a plurality of computing devices, the memory of scanning device 110, signal interpretation system 120, and/or response generation device 160 may include the respective memory of each computing device of the plurality of computing devices.

Figure 5:
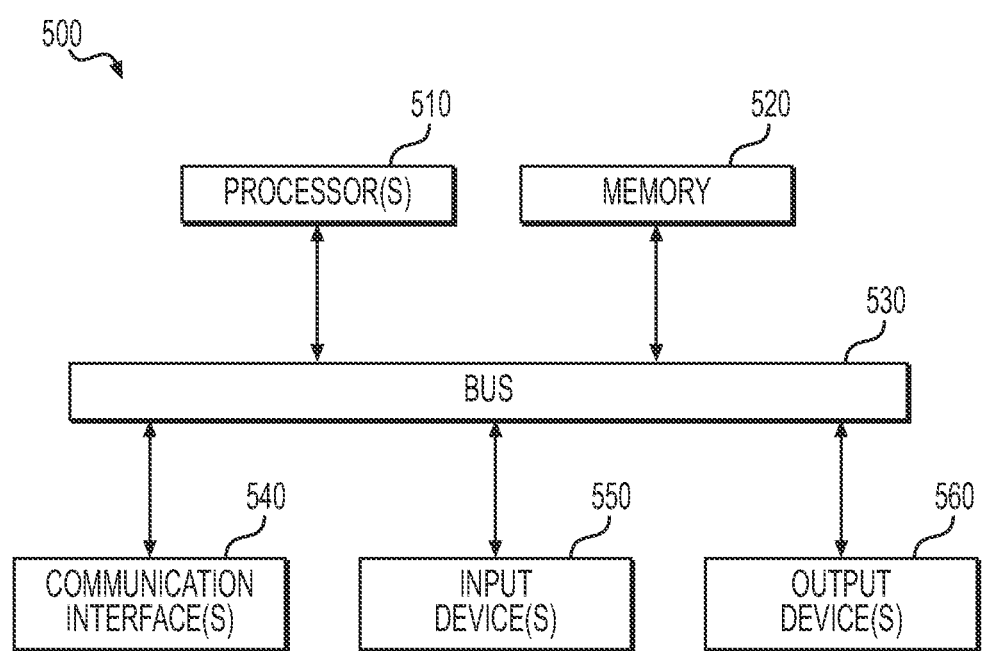
FIG. 5 depicts an example of a computing device, according to one or more embodiments.

FIG. 5 illustrates an example of a computing device 500 of a computer system, such as scanning device 110, signal interpretation system 120, and/or response generation device 160. The computing device 500 may include processor(s) 510 (e.g., CPU, GPU, or other such processing unit(s)), a memory 520, and communication interface(s) 540 (e.g., a network interface) to communicate with other devices. Memory 520 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 520. The computing device 500 may, in some embodiments, further include input device(s) 550 (e.g., a keyboard, mouse, or touchscreen) and output device(s) 560 (e.g., a display, printer). The aforementioned elements of the computing device 500 may be connected to one another through a bus 530, which represents one or more busses. In some embodiments, the processor(s) 510 of the computing device 500 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as an embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method comprising:
receiving, from a first device of a user, information associated with an article captured by the first device, and a geographic location of the first device when the information is captured;
identifying a merchant associated with one or more of the article or the geographic location;
determining an interest of the user in the article; and
based on the determined interest of the user:
generating and providing a first notification to a merchant device of the merchant, the first notification indicating the interest of the user in the article, and prompting generation of a response associated with the article, wherein the merchant device generates the response including a response element; and
generating and providing a second notification to the first device or a second device of the user, the second notification causing a user interface section that corresponds to the article and includes one or more of a plurality of graphical elements to be displayed on a display of the first device or the second device, wherein the user interface section is updated to include the response element generated by the merchant device as one of the plurality of graphical elements.

2. The computer-implemented method of claim 1, further comprising:
receiving the response from the merchant device, wherein the response element is included in the second notification provided to the first device or the second device of the user.

3. The computer-implemented method of claim 1, wherein the response is provided directly from the merchant device to the first device or the second device of the user.

4. The computer-implemented method of claim 1, wherein the plurality of graphical elements include a plurality of types of graphical elements, and at least one of the plurality of types associated with the response element, is only configured to be updated based on authorization received from the merchant device.

5. The computer-implemented method of claim 1, wherein the merchant is at least associated with the article, and identifying the merchant associated with the article comprises:
comparing the article to a plurality of articles included in at least a portion of inventory of a plurality of merchants, including the merchant, stored in one or more data stores.

6. The computer-implemented method of claim 1, wherein the merchant is at least associated with the geographic location, and identifying the merchant associated with the geographic location comprises:
comparing the geographic location to a plurality of known geographic locations of a plurality of merchants, including the merchant, stored in one or more data stores.

7. The computer-implemented method of claim 1, wherein determining the interest of the user in the article comprises:
receiving one or more signals indicative of the interest of the user in the article; and
evaluating the one or more signals to determine a degree of interest of the user in the article.

8. The computer-implemented method of claim 7, wherein the one or more signals include one or more of: a number of times information associated with the article is captured, a number of times information associated with a similar article is captured, a number of articles for which information is captured at the geographic location, a number of geographic locations at which information associated with articles are captured over a predetermined period of time, a number of times the article is searched for by the user, or profile information of the user.

9. The computer-implemented method of claim 1, wherein generating and providing the second notification further comprises:
providing the second notification to the first device or the second device in response to determining one or more predetermined conditions are met, wherein the one or more predetermined conditions include an elapse of a predetermined period of time or the determined interest of the user meeting a predetermined minimum amount of interest.

10. A computer-implemented method comprising:
receiving, from a first device of a user, an image including at least a portion of a vehicle captured by the first device, and a geographic location of the first device when the image is captured;
identifying the vehicle from the image;
identifying a merchant associated with one or more of the vehicle or the geographic location;
determining an interest of the user in the vehicle; and
based on the determined interest of the user:
generating and providing a first notification to a merchant device of the merchant, the first notification indicating the interest of the user in the vehicle, and prompting generation of a response associated with the vehicle, wherein the merchant device generates the response including a response element providing one or more of an offer, a reminder, or a view invitation associated with the vehicle or another vehicle similar to the vehicle; and
generating and providing a second notification to the first device or a second device of the user, the second notification causing a user interface section that corresponds to the vehicle and includes one or more of a plurality of graphical elements to be displayed on a display of the first device or the second device, wherein the user interface section is updated to include the response element generated by the merchant device as one of the plurality of graphical elements displayed.

11. The computer-implemented method of claim 10, wherein identifying the vehicle from the image comprises:
processing the image using a trained machine learning model to identify the vehicle.

12. The computer-implemented method of claim 10, wherein determining the interest of the user in the vehicle comprises:
receiving one or more signals indicative of the interest of the user in the vehicle; and
evaluating the one or more signals to determine a degree of interest of the user in the vehicle, wherein the one or more signals include one or more of: a number of images captured of the vehicle, a number of images captured of one or more similar vehicles, a number of images captured at the geographic location, a number of geographic locations at which images of vehicles were captured over a predetermined period of time, a number of times the vehicle is searched for by the user, or profile information of the user.

13. The computer-implemented method of claim 10, wherein the geographic location is a geographic location of a vehicle lot associated with the merchant or another merchant.

14. A computer-implemented method comprising:
receiving, at a first device of a user from a signal interpretation system, a first notification indicating an article determined to be of interest to the user and identified by the signal interpretation system from scanned information captured by the first device or a second device of the user at a geographic location;
in response to receiving the first notification, displaying, on a display of the first device, a user interface section corresponding to the article, the user interface section including a plurality of graphical elements associated with one or more of the article or the geographic location;
receiving, from one of the signal interpretation system or a merchant device of a merchant associated with one or more of the article or the geographic location, a second notification including a response element generated by the merchant device in response to the merchant device being prompted by the signal interpretation system to generate the response element based on the determined interest to the user; and
in response to receiving the second notification, updating the user interface section to include the response element.

15. The computer-implemented method of claim 14, wherein the first notification further indicates an other article determined to be of interest to the user and identified by the signal interpretation system from scanned information captured by the first device or the second device of the user at a same or different geographic location as the first article, and the method further comprises:
in response to receiving the first notification, further displaying, on the display of the first device, an other user interface section corresponding to the other article, the other user interface section including a plurality of graphical elements associated with one or more of the other article or the same or different geographic location.

16. The computer-implemented method of claim 15, wherein the signal interpretation system is configured to rank the article and the other article based on a degree of interest of the user in each of the article and the other article determined by the signal interpretation system, and the method further comprises:
displaying the other user interface section relative to the user interface section on the display of the first device based on the rank of the other article relative to the article.

17. The computer-implemented method of claim 14, further comprising:
displaying the updated user interface section on the display of the first device in response to detecting one or more of a launch of an application on the first device associated with a provider of the signal interpretation system, navigation to a site of the provider on a web browser executing on the first device, or navigation to a site of the merchant on the web browser.

18. The computer-implemented method of claim 14, wherein the first device is navigated to a page of an application executing on the first device that includes a search filter, and the method further comprises:
in response to receiving the first notification, automatically generating or updating the search filter based on the article.

19. The computer-implemented method of claim 14, wherein the plurality of graphical elements include one or more of an image of the article, information associated with the article, an active element selectable to display additional information associated with the article, and a location element associated with the geographic location.

20. The computer-implemented method of claim 14, wherein the response element includes one or more of an offer, a reminder, or a view invitation associated with the article or another article similar to the article.

* * * * *